US006642299B2

(12) United States Patent
Wertz et al.

(10) Patent No.: US 6,642,299 B2
(45) Date of Patent: Nov. 4, 2003

(54) UREA-FORMALDEHYDE RESIN BINDERS CONTAINING STYRENE ACRYLATES AND ACRYLIC COPOLYMERS

(75) Inventors: Stacey L. Wertz, Conyers, GA (US); George J. Anderson, Stockbridge, GA (US); Kurt D. Gabrielson, Liburn, GA (US); John B. Hines, Atlanta, GA (US); William S. King, Liburn, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 24 days.

(21) Appl. No.: 09/742,445

(22) Filed: Dec. 22, 2000

(65) Prior Publication Data

US 2002/0117279 A1 Aug. 29, 2002

(51) Int. Cl.$^7$ .............................. C08K 5/07; C08L 31/00
(52) U.S. Cl. ..................... 524/512; 524/186; 524/555; 525/163
(58) Field of Search ................. 524/512, 555, 524/186; 525/163

(56) References Cited

U.S. PATENT DOCUMENTS

| | | | |
|---|---|---|---|
| 4,386,943 A | 6/1983 | Gumbel et al. | 51/298 |
| 4,459,379 A | 7/1984 | Schwarz | 523/501 |
| 4,917,764 A | 4/1990 | Lalwani et al. | 162/156 |
| 5,290,849 A | 3/1994 | Lee | 524/555 |
| 5,698,302 A | 12/1997 | Brandon et al. | 428/215 |
| 5,698,304 A | 12/1997 | Brandon et al. | 428/215 |
| 5,744,229 A | 4/1998 | Gleason et al. | 428/297.4 |
| 5,804,254 A | 9/1998 | Nedwick et al. | 427/389.8 |
| 5,851,933 A | 12/1998 | Swartz et al. | 442/180 |
| 5,914,365 A | 6/1999 | Chang et al. | 524/512 |
| 6,384,116 B1 | 5/2002 | Chan et al. | 524/186 |

FOREIGN PATENT DOCUMENTS

| | | |
|---|---|---|
| EP | 0 184 153 | 6/1986 |
| WO | WO 94/11576 | 5/1994 |
| WO | WO 98/34885 | 8/1998 |

OTHER PUBLICATIONS

Abstract Entitled: "High Strength Glass Fiber Mat Particularly Useful For Roofing Products, Built–Up Roofing Membranes And Systems And Method Of Making Such Products", Nov. 26, 1980.

*Primary Examiner*—Terrel Morris
*Assistant Examiner*—John J. Guarriello
(74) *Attorney, Agent, or Firm*—Banner & Witcoff, Ltd.

(57) ABSTRACT

An aqueous binder composition containing a urea-formaldehyde resin modified with an additive comprising (1) styrene acrylic acid or styrene acrylate, (2) an adduct of styrene, maleic anhydride, and an acrylic acid or acrylate or (3) a physical mixture of a styrene acrylic acid or styrene-acrylate copolymer and a styrene-maleic anhydride copolymer. The resulting binder is used in the preparation of fiber mats.

9 Claims, No Drawings

UREA-FORMALDEHYDE RESIN BINDERS CONTAINING STYRENE ACRYLATES AND ACRYLIC COPOLYMERS

FIELD OF THE INVENTION

The invention relates to a modified, thermosetting urea-formaldehyde resin composition useful as a binder for making fiber mats, to fiber mats prepared using the modified urea-formaldehyde resin as a binder, and to a process of preparing mats using the binder.

BACKGROUND OF THE INVENTION

Glass fiber mats and fiber mats made from other synthetic fibers are finding increasing application in the building materials industry, as for example, in composite flooring, in asphalt roofing shingles, or siding, replacing similar sheets traditionally made using wood, cellulose or asbestos fibers.

Fiber mats, and especially glass fiber mats, usually are made commercially by a wet-laid process, which is carried out on what can be viewed as modified paper-making machinery. Descriptions of the wet-laid process may be found in a number of U.S. patents, including U.S. Pat. Nos. 2,906,660, 3,012,929, 3,050,427, 3,103,461, 3,228,825, 3,760,458, 3,766,003, 3,838,995 and 3,905,067. In general, the wet-laid process for making glass fiber mats comprises first forming an aqueous slurry of short-length glass fibers (referred to in the art as "white water") under agitation in a mixing tank, then feeding the slurry onto a moving screen on which the fibers enmesh themselves into a freshly prepared wet glass fiber mat, while excess water is separated therefrom.

Unlike natural fibers such as cellulose or asbestos, glass fibers do not disperse well in water. To overcome this problem, it has been the industry practice to provide suspending aids for the glass fibers. Such suspending aids or dispersants usually are materials which increase the viscosity of the aqueous medium. Suitable dispersants conventionally employed in the art include polyacrylamides, hydroxyethyl cellulose, ethoxylated amines and amine oxides. Other additives such as surfactants, lubricants and defoamers also have conventionally been added to the white water. Such agents, for example, further aid the wettability and dispersion of the glass fibers. Experience has shown that such additives also often influence the strength of the wet glass fiber mat.

The fiber slurry deposited on the moving screen or cylinder is processed into a sheet-like fiber mat by the removal of water, usually by suction and/or vacuum devices, and is followed by the application of a polymeric binder to the mat. In the manufacture of glass fiber mats, a high degree of flexibility and tear strength is desired in the finished mat in addition to primary dry tensile and wet tensile properties. A binder composition is therefore used to hold the glass fiber mat together. The binder composition is impregnated directly into the fibrous mat and set or cured immediately thereafter to provide the desired mat integrity. The binder composition is applied to the mat by soaking the mat in an excess of binder solution or suspension, or by impregnating the mat surface by means of a binder applicator, for example, by roller or spray. The primary binder applicator for glass mat machines has been the falling film curtain coater. Suction devices often are also utilized for further removal of water and excess binder and to ensure a thorough application of binder through the glass fiber mat. A widely used binder is based on a urea-formaldehyde resin commonly fortified with an emulsion polymer. UF resins have been employed because they are relatively inexpensive. In addition to mat strength properties which the binder composition imparts to the ultimately cured mat, the binder also functions to improve the strength of the uncured, wet-laid mat as it is transported from its initial formation into and through the curing oven. Such incipient pre-cured strength is needed to avoid process delays and shutdowns caused by breaks in the endless mat.

Thus-incorporated binder is thermally cured, typically in an oven at elevated temperatures. Generally, a temperature in the range of about 200 to 250° C. is used during curing. Normally, this heat treatment alone will effect curing of the binder. Catalytic curing, such as is accomplished with addition of an acid catalyst (for example, ammonium chloride or p-toluene sulfonic acid), generally is a less desirable, though an optional, alternative.

Because glass fiber mats made with a binder consisting essentially of a UF resin often are brittle, or because the strength properties of the mats may deteriorate appreciably subsequent to their preparation, especially when the mats are subjected to wet conditions, UF resin binders have commonly been modified by formulating the UF resin with cross-linkers and various catalyst systems or by fortifying the UF resin with a large amount of latex (emulsion) polymer, usually a polyvinyl acetate, vinyl acrylic or styrene-butadiene. Certain latexes can provide increased wet tensile strength and tear strength. The use of styrene-butadiene latex-modified, urea-formaldehyde resin compositions as a binder for glass fiber mats is disclosed, for example, in U.S. Pat. Nos. 4,258,098; 4,560,612 and 4,917,764.

U.S. Pat. No. 5,914,365 is directed to a binder formulation for making glass mats. An aqueous urea-formaldehyde (UF) fiber mat adhesive binder formulation is modified by the addition of a minor amount of a water soluble, styrene-maleic anhydride (SMA) copolymer. The addition of SMA to the primarily UF adhesive resin is known to improve both the wet and dry tensile properties of the mat. However, even higher tensile strengths and wet web strengths are desired.

SUMMARY OF THE INVENTION

The invention is directed to an aqueous fiber mat adhesive binder composition comprising a thermosetting urea-formaldehyde (UF) resin. The invention is more specifically directed to an aqueous binder composition containing as its major component a thermosetting UF resin and as a minor, modifying component, an additive comprising (1) styrene acrylic acid or styrene acrylate, (2) an adduct of styrene, maleic anhydride, and an acrylic acid or acrylate or (3) a physical mixture of a styrene acrylic acid or styrene-acrylate copolymer and a styrene-maleic anhydride copolymer. The adduct (2) can be preformed and then added to the UF resin, or can be formed in situ in the resin binder by blending, with the UF resin, a physical mixture of styrene-maleic anhydride and an acrylate monomer.

The invention also is directed to a process for preparing fiber mats, preferably glass fiber mats, using the binder, and to fiber mats produced by the method. The mats are useful, for example, as substrates in the manufacture of roofing shingles.

DETAILED DESCRIPTION OF THE INVENTION

As described in U.S. Pat. No. 5,914,365, the addition of SMA to a primary UF adhesive resin improves both the wet and dry tensile properties of a fiber mat. It was discovered that the further addition of an acrylate to the SMA unexpectedly resulted in still greater improvements of the wet strength of the mat prior to cure and the tensile properties of the cured mat.

The invention is thus directed to the addition of an effective amount of an adduct of styrene, maleic anhydride, and an acrylate to a thermosetting urea-formaldehyde resin-based binder and to using the modified binder to prepare fiber mats. The fiber mats have improved wet and dry tensile properties over such properties obtained in accordance with U.S. Pat. No. 5,914,365. The adduct can be preformed and then added to the UF resin, or can be formed in situ in the resin binder by blending, with the UF resin, a physical mixture of styrene-maleic anhydride and an acrylic acid or acrylate monomer.

It was further discovered that improvements in tensile strength and wet strength may also be obtained in the absence of the maleic anhydride. Thus, the invention is further directed to the addition of an effective amount of a styrene acrylic acid or styrene acrylate to a thermosetting urea-formaldehyde resin-based binder and to using the modified binder to prepare fiber mats.

In addition, the invention is directed to adding a physical mixture of a styrene acrylic acid or styrene-acrylate copolymer and a styrene-maleic anhydride copolymer to a UF resin-based binder.

The process of forming a fiber mat, and especially a glass fiber mat in accordance with the invention begins with chopped bundles of glass fibers of suitable length and diameter for the intended application. While reference is made hereinafter to using chopped bundles of glass fibers, other fiber types, e.g., mineral fibers and synthetic fibers and other forms of fibers such as continuous strands, may also be used. Generally, fibers having a length of about ¼ inch to 3 inches and a diameter of about 3 to 20 microns are used for most applications. Each bundle may contain from about 20 to 500, or more, of such fibers. Suitable fibers are available commercially from Owens-Corning Fiberglass and Johns Manville.

The glass fiber bundles are added to an aqueous dispersant medium to form an aqueous slurry, known in the art as "white water." The white water typically contains about 0.5% glass fibers. Any viscosity modifier or dispersant, including those commonly used in the past, can be used in the practice of the present invention including hydroxyethyl cellulose, ethoxylated amines, polyacrylamides, amine oxides and the like. Polyacrylamide and amine oxide white water systems have proven to be particularly compatible with the binder composition of the present invention. The amount of viscosity modifier used should be effective to provide the viscosity needed to suspend the glass fibers in the white water as needed to practice the method used to form the wet laid mat. The white water viscosity is generally in the range of 1 to 20 cps, preferably 1.5 to 8 cps. The fiber slurry then is agitated to form a workable, uniform dispersion of glass fibers having a suitable consistency. The viscosity modifier also may contain other conventional additives known in the art. These include dispersion aids, surfactants, lubricants, defoamers and the like.

The fiber/water dispersion then is passed to a mat-forming machine typically containing a mat forming screen. On route to the screen, the dispersion often is diluted further with water to a lower fiber concentration. The fibers are collected at the screen in the form of a wet fiber mat and excess water is removed by gravity or, more often, by vacuum assist in a conventional manner.

The binder composition of the invention then is applied to the gravity- or vacuum-assisted dewatered wet fiber mat. Application of the binder composition may be accomplished by any conventional means, such as by soaking the mat in an excess of binder solution or suspension, or by coating the mat surface with binder by means of a binder applicator, such as a falling film or curtain coater.

The thermosetting urea-formaldehyde (UF) resin used as the major component of the binder composition can be prepared from urea and formaldehyde monomers or from UF precondensates in manners well known to those of skill in the art.

Skilled practitioners recognize that the urea and formaldehyde reactants are commercially available in many forms. Any form which can react with the other reactants and which does not introduce extraneous moieties deleterious to the desired reaction and reaction product can be used in the preparation of urea-formaldehyde resins useful in the invention. One particularly useful class of UF resins for use in preparing binders in accordance with the present invention is disclosed in U.S. Pat. No. 5,362,842, the disclosure of which is incorporated herein by reference.

Formaldehyde for making a suitable UF resin is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in preparing a UF resin in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde adducts, often in aqueous solution. Any form of urea or urea in combination with formaldehyde is suitable for use in the practice of the invention. Both urea prill and combined urea-formaldehyde products are preferred, such as Urea-Formaldehyde Concentrate or UFC 85. These types of products are disclosed in, for example, U.S. Pat. Nos. 5,362,842 and 5,389,716.

Any of the wide variety of procedures used for reacting the principal urea and formaldehyde components to form a UF thermosetting resin composition also can be used, such as staged monomer addition, staged catalyst addition, pH control, amine modification and the like. Generally, the urea and formaldehyde are reacted at a mole ratio of formaldehyde to urea in the range of about 1.1:1 to 4:1, and more often at an F:U mole ratio of between about 1.8:1 to 3.2:1. Generally, the UF resin is highly water dilutable, if not water soluble.

Many thermosetting urea-formaldehyde resins that may be used in the practice of this invention are commercially available. Urea-formaldehyde resins such as the types sold by Georgia Pacific Resins, Inc. (such as GP-2928 and GP-2981) for glass fiber mat applications, those sold by Borden Chemical Co., and by Neste Resins Corporation may be used. These resins are prepared in accordance with previous teachings and contain reactive methylol groups which, upon curing, form methylene or ether linkages. Such methylol-containing adducts may include N,N-dimethylol, dihydroxymethylolethylene; N,N-bis(methoxymethyl), N,N-dimethylolpropylene; 5,5-dimethyl-N,N-dimethylolethylene; N,N-dimethylolethylene; and the like.

Urea-formaldehyde resins useful in the practice of the invention generally contain 45 to 70%, and preferably, 55 to 65% non-volatiles, generally have a viscosity of 50 to 600 cps, preferably 150 to 400 cps, normally exhibit a pH of 7.0 to 9.0, preferably 7.5 to 8.5, and often have a free formaldehyde level of not more than about 3.0%, and a water dilutability of 1:1 to 100:1, preferably 5:1 and above.

The reactants for making the UF resin may also include a small amount of resin modifiers such as ammonia, alkanolamines, or polyamines, such as an alkyl primary diamine, e.g., ethylenediamine (EDA). Additional modifiers, such as melamine, ethylene ureas, and primary, secondary and tertiary amines, for example, dicyanodiamide, can also be incorporated into UF resins used in the invention. Concentrations of these modifiers in the reaction mixture often will vary from 0.05 to 20.0% by weight of the UF resin solids. These types of modifiers promote hydrolysis resistance, polymer flexibility and lower formaldehyde emissions in the cured resin. Further urea additions for purposes of scavenging formaldehyde or as a diluent also may be used.

The minor, modifying component, is an additive comprising (1) styrene acrylic acid or styrene acrylate, (2) an adduct of styrene, maleic anhydride, and an acrylic acid or acrylate or (3) a physical mixture of a styrene acrylic acid or styrene-acrylate copolymer and a styrene-maleic anhydride copolymer.

The adduct (2) can be preformed and then added to the UF resin, or can be formed in situ in the resin binder by blending, with the UF resin, a physical mixture of styrene-maleic anhydride and an acrylate monomer.

For example, the adduct can be prepared by combining styrene, maleic anhydride, and an acrylate or acrylic acid in amounts to form a terpolymer. The amount of styrene is generally about 50 to about 85%, preferably about 70%. The amount of maleic anhydride is generally about 15 to about 50%, preferably about 25%. The amount of an acrylate or acrylic acid is generally about 1 to about 20%, preferably about 5%.

The constituents of the terpolymer are dissolved in a suitable solution such as an aqueous solution of sodium hydroxide, ammonium hydroxide, potassium hydroxide, or combinations thereof. Preferably about 1–5% of the terpolymer constituents are dissolved in the aqueous solution. The solution is heated, generally to about 70° C. to about 90° C., and held until all terpolymer is in solution. The solution is then added to a urea-formaldehyde resin.

Alternatively the acrylic acid or acrylate is combined with styrene maleic anhydride in situ with the urea-formaldehyde resin. The result is a styrene maleic anhydride methylmethacrylate terpolymer.

Any suitable acrylic acid or acrylate may be used such as is methyl methacrylate, butyl acrylate, or methacrylate. Preferably, the acrylate is methyl methacrylate (MMA).

Styrene-maleic anhydride (SMA) copolymers that are useful in the present invention are known resins. Such resins are composed of alternating styrene and maleic anhydride monomer units, arranged in random, alternating or block form. Suitable SMA copolymers are described in U.S. Pat. No. 5,914,365 at column 5, line 29, through column 6, line 10, which description is hereby incorporated by reference in its entirety.

In order to insure suitable storage stability of the modified binder composition and proper performance during use of the binder composition, it is important that the pH of the aqueous mixture of the UF and adduct components end up within the range of about 6 to 9, and more preferably between about 7 and 8.5. Too low a pH causes premature curing of the UF resin and incompatibility of the constituents; too high a pH retards curing of the composition on heating during use.

The additive makes up about 0.1 wt % to about 10 wt %, preferably about 0.5 to about 5 of the undiluted binder mix solids. The mix is typically diluted and then applied with a curtain coater to a mat. The total concentration of non-volatile components in the aqueous binder composition (predominantly UF resin and additive solids) also can vary widely in accordance with the practice of the present invention, but it will usually be found convenient and satisfactory to make up this composition at total solids concentration in the range from about 5 to about 40 percent by weight of the total aqueous binder composition. Preferably the total solids are from about 20 to about 35 wt %, more preferably from about 20 wt % to about 30 wt %. As used herein, the solids content of a composition is measured by the weight loss upon heating a small, e.g., 1–5 gram, sample of the composition at about 105° C. for about 3 hours.

The binder can be further modified with styrene butadiene rubber for flexibility, with acrylic, vinyl acrylic, polyvinyl alcohol, or other latex for improved tensile strength, flexibilizing amines, or other additives for specialty mat production.

The binder composition may also contain a variety of other known additives such as a silica colloid to enhance fire resistance, antifoamers, biocides, pigments, and the like, normally in small proportions relative to the essential UF resin and terpolymer constituents.

The amount of binder applied to the mat also can vary considerably in the broad practice of the present invention, but loadings in the range of about 3 to about 45 percent by weight, preferably about 10 to about 40 percent by weight, and more usually about 15 to about 25 percent by weight, of nonvolatile binder composition based on the dry weight of the bonded mat, will be found advantageous. For inorganic fibrous mats, this value can normally be confirmed by measuring the percent loss on ignition (LOI) of the fiber mat product.

The binder composition of this invention can be employed with any fibers which can be formed into mats in any suitable manner. The fibers may be organic or inorganic, preferably inorganic fibers are used. Inorganic fibers include, but are not limited to, glass fibers, mineral fibers, graphite fibers, metal fibers and metal coated glass or graphite fibers. Asbestos fibers also could be used, but are normally undesirable for health reasons. Organic fibers include, but are not limited to, acrylic, aromatic polyamide, polyester, cellulosic including cellulose, and polyolefin fibers. The fibers generally comprise from about 50 to about 97 percent by weight of solids, in the mat on a dry weight basis. Inorganic fibers are generally preferred.

The binder composition of the invention sets or cures at elevated temperatures below the decomposition temperature of the UF resin and terpolymer components. The setting or curing of the binder composition can occur at temperatures from about 135° C. to about 300° C., preferably from about 135° C. to about 275° C. At these temperatures, the binder composition will typically cure in periods ranging from about 1 to about 60 seconds. Although the binder composition may cure more rapidly at higher temperatures, excessively high temperatures can cause deterioration of the binder composition or the fibers of the mat, which in turn causes a deterioration of the bonded mat physical and functional properties.

Following application of the aqueous binder composition to the wet laid mat, the glass fiber mat is dewatered, normally under vacuum, to remove excess binder solution. The mat then is dried and the incorporated binder composition is cured in an oven at elevated temperatures, generally at a temperature of at least about 170° C., more typically 200 to 250° C., for a time sufficient to cure the resin. The amount of time needed to cure the resin is readily determinable by the skilled practitioner. Heat treatment alone is sufficient to effect curing. Alternatively, but generally less desirable, catalytic curing in the absence of heat may be used, such as is accomplished upon the addition of an acid catalyst, e.g., ammonium chloride or p-toluene sulfonic acid. One important advantage that has been observed in connection with the present invention is that the binder of the invention imparts a surprisingly high degree of strength to the wet formed, uncured, binder-impregnated mat. The strength of the so-formed mat is sufficiently enhanced to allow the mat forming operation to run at significantly higher processing speeds than has been conventionally used with mats made using unmodified and latex modified UF resins without risking breakage of the endless mat. Such operation substantially improves the economics of the mat forming operation.

The finished glass mat product generally contains between about 60% and 90% by weight glass fibers and between about 10% and 40% by weight of cured binder, 15–30% of binder being most preferable.

The following examples are intended to be illustrative only and do not limit the scope of the claimed invention.

EXAMPLES

In the following examples, a terpolymer of 70% styrene (S)/25% maleic anhydride (MA)/5% methyl methacrylate (MMA) is dissolved at 14% in a solution of approximately 1% sodium hydroxide and 1% ammonium hydroxide. The solution is heated to 82° C. and held until all of the terpolymer is in solution. This is then added to a urea-formaldehyde resin at 0.1%–10% of solids to enhance wet web strength (at low levels) and tensile strength (at levels of 0.5% and above).

Example 1

Glass mat hand sheets were prepared with glass fibers and binders prepared with the same UF resin and varying amounts of SMA and of SMA and MMA as indicated in the Table below. The SMA modified UF resin was prepared in accordance with the U.S. Pat. No. 5,914,365. The SMA with MMA was prepared as described above. The percentage amounts indicate solids. The UF resin was GP 938D37, a standard UF resin. The SMA used was GP NOVACOTE 1903 and the SMA/MMA used was Bayer DMC 250. The fibers were GAF M 1" fiber. Amine oxide white water was used to prepare the glass mats.

The glass mat hand sheets were tested for wet web strengths to determine the effect of the additive.

| Binder System | Wet Web Strength (g) |
|---|---|
| UF (comp) | 80 |
| UF + 0.5% SMA (comp) | 218 |
| UF + 1% SMA (comp) | 240 |
| UF + 0.5% SMA w/MMA (Inv) | 329 |
| UF + 1% SMA w/MMA (Inv) | 361 |

Example 2

Glass mat hand sheets were prepared with glass fibers and binders prepared with the same UF resin and varying amounts of SMA and of SMA and MMA as indicated in the Table below. The SMA modified UF resin was prepared in accordance with the U.S. Pat. No. 5,914,365. The SMA with MMA was prepared as described above. The percentage amounts indicate solids. The UF resin was GP 2948, a standard UF resin, a one-component product with styrene-maleic anhydride already added. The SMA used was GP NOVACOTE 1903 and the SMA/MMA used was Bayer DMC 250. The fibers were Johns Manville 137 1" fiber. Polyacrylamide white water was used to prepare the glass mats.

Hot-wet tensile retention was measured after a 10 minute soak at 85° C.

| Binder System | % Hot-wet tensile retention |
|---|---|
| UF (comp) | 62 |
| UF + 0.5% SMA (comp) | 62 |
| UF + 1% SMA (comp) | 66 |
| UF + 0.5% SMA w/MMA (Inv) | 100 |
| UF + 1% SMA w/MMA (Inv) | 87 |

Example 3

Glass mat hand sheets were prepared with glass fibers and binders prepared with the same amine modified UF resin and 1) latex, 2) 2.3 wt % SMA, and 3) 2.3 wt % SMA/MMA as indicated in the table below. The amine modified UF glass mat resin with vinyl acrylic latex added for tensile strength was GP 888D88. The amine modified UF resin used with SMA or SMA/MMA was GP2981. The SMA used was GP Novacote 1903 and the SMA/MMA used was Bayer DMC 250. The fibers were Johns Manville 137 1" fiber. Polyacrylamide white water was used to prepare the glass mats.

The glass mat hand sheets were tested for dry tensile strengths to determine the effect of the additive. Dry tensiles were measured in pounds using an Instron 1122.

| Binder | UF/latex | UF-2.3% SMA | UF-2.3% SMA/MMA |
|---|---|---|---|
| Dry Tensile Strength | 113 | 106 | 128 |

We claim:

1. An aqueous binder composition for use in making fiber mats comprising as a major component a thermosetting urea-formaldehyde resin and as a minor component a water-soluble additive selected from the group consisting of (1) a polymer of styrene acrylic acid or styrene acrylate, (2) a polymer of styrene, maleic anhydride, and an acrylic-acid or acrylate and (3) a physical mixture of a styrene acrylic acid or styrene-acrylate copolymer and a styrene-maleic anhydride copolymer.

2. The aqueous binder of claim 1 wherein the additive is styrene acrylic acid or styrene acrylate.

3. The aqueous binder of claim 1 wherein the additive is a polymer of styrene, maleic anhydride, and an acrylic acid or acrylate.

4. The aqueous binder of claim 3 wherein the polymer comprises a terpolymer of styrene, maleic anhydride and methyl methacrylate.

5. The aqueous binder of claim 1 wherein the polymer comprises a terpolymer of about 50 wt % to about 85 wt % styrene, about 15 wt % to about 50 wt % maleic anhydride and about 1 wt % to about 20 wt % acrylate or acrylic acid.

6. The aqueous binder of claim 3 wherein the polymer of styrene, maleic anhydride, and an acrylic acid or acrylate; is preformed and then added to the urea-formaldehyde resin.

7. The aqueous binder of claim 3 wherein the polymer of styrene, maleic anhydride, and an acrylic acid or acrylate is formed in situ in the urea-formaldehyde resin by blending styrene-maleic anhydride and an acrylate or acrylic acid.

8. The aqueous binder of claim 1 wherein the acrylic acid or acrylate is methyl methacrylic acid or methyl methacrylate.

9. The aqueous binder of claim 1 contains about 0.1 to about 10 wt % solids based on total urea-formaldehyde resin and additive solids.

* * * * *

UNITED STATES PATENT AND TRADEMARK OFFICE
CERTIFICATE OF CORRECTION

PATENT NO. : 6,642,299 B2
DATED : November 4, 2003
INVENTOR(S) : Stacey L. Wertz et al.

It is certified that error appears in the above-identified patent and that said Letters Patent is hereby corrected as shown below:

<u>Title page,</u>
Item [*] Notice, "24 days" has been replaced with -- 74 days --.

Signed and Sealed this

Thirteenth Day of April, 2004

JON W. DUDAS
*Acting Director of the United States Patent and Trademark Office*